United States Patent
Jha et al.

(10) Patent No.: US 12,381,497 B2
(45) Date of Patent: Aug. 5, 2025

(54) METHOD FOR OPERATING A POWER SUPPLY SYSTEM THAT SUPPLIES POWER TO A GRID TO MAINTAIN STATOR CURRENT OCCURRING AT A HARMONIC FREQUENCY BELOW A THRESHOLD VALUE

(71) Applicant: General Electric Renovables Espana, S.L., Barcelona (ES)

(72) Inventors: Kapil Jha, Bangalore (IN); Pushkar Chandrakant Chaudhari, Bangalore (IN); Werner Gerhard Barton, Salzbergen (DE); Parag Rameshchandra Dharmadhikari, Garching b. München (DE); Prasun Mishra, Kharagpur WB (IN); Sonam Acharya, New Delhi (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/403,017

(22) Filed: Jan. 3, 2024

(65) Prior Publication Data

US 2024/0223112 A1    Jul. 4, 2024

(30) Foreign Application Priority Data

Jan. 4, 2023 (EP) .................... 23150321

(51) Int. Cl.
*H02P 9/10* (2006.01)
*F03D 9/25* (2016.01)
(Continued)

(52) U.S. Cl.
CPC ............. *H02P 9/105* (2013.01); *F03D 9/255* (2017.02); *H02P 9/007* (2013.01); *F05B 2220/706* (2013.01); *H02P 2101/15* (2015.01)

(58) Field of Classification Search
CPC ... F03D 9/255; H02J 3/01; H02J 3/381; H02J 2300/28; H02P 9/007; H02P 9/105; H02P 2101/15; F05B 2220/706
(Continued)

(56) References Cited

U.S. PATENT DOCUMENTS 11,736,056 B2    8/2023   Jha et al.
2011/0074365 A1   3/2011   Nakayama et al.
(Continued)

FOREIGN PATENT DOCUMENTS

EP    3484007 A1    5/2019
EP    3745551 A1   12/2020

OTHER PUBLICATIONS

European Search Report Corresponding to EP23150321 on Jun. 20, 2023.
(Continued)

*Primary Examiner* — Tulsidas C Patel
*Assistant Examiner* — S. Mikailoff
(74) *Attorney, Agent, or Firm* — Dority & Manning, P.A.

(57) ABSTRACT

A method for operating a power supply system connected to a grid, the power supply system including a rotor, a doubly-fed induction generator (DFIG), a power conversion assembly, and an active filter. The DFIG includes a generator rotor mechanically connected with the rotor and a generator stator. The power conversion assembly includes a rotor-side power converter. The active filter electrically connected with the generator stator via a stator bus and the rotor-side power converter electrically connected with the generator rotor via a rotor bus. Based on a rotor frequency of the generator rotor, the method determines an expected harmonic frequency for a stator current flowing on the stator bus. An amplitude of the stator current at the expected harmonic frequency is determined via a data set of stator current values. The method controls the active filter based on the amplitude of the stator current at the expected harmonic frequency.

13 Claims, 7 Drawing Sheets

(51) Int. Cl.
*H02P 9/00* (2006.01)
*H02P 101/15* (2016.01)

(58) Field of Classification Search
USPC .................................................. 290/44, 55
See application file for complete search history.

(56) References Cited

U.S. PATENT DOCUMENTS

| | | |
|---|---|---|
| 2019/0140569 A1 | 5/2019 | Schnetzka et al. |
| 2020/0382046 A1* | 12/2020 | Jha .......................... H02J 3/381 |
| 2024/0223112 A1* | 7/2024 | Jha .......................... H02J 3/381 |

OTHER PUBLICATIONS

Hernandez et al., A Step Forward in the Modeling of the Doubly-Fed Induction Machine for Harmonic Analysis, IEEE Transactions on Energy Conversion, vol. 29, No. 1, 149-157. (Abstract Only) https://doi.org/10.1109/TEC.2013.2290297.

Mishra et al., Load Harmonics Compensation in Autonomous DFIG Based Wind Turbine Systems, XP033546971, IEEE 2018 3$^{rd}$ International Conference and Workshops on Recent Advances and Innovations in Engineering, 2018, 1-7. (Abstract Only) https://ieeexplore.ieee.org/abstract/document/8710388.

* cited by examiner

METHOD FOR OPERATING A POWER SUPPLY SYSTEM THAT SUPPLIES POWER TO A GRID TO MAINTAIN STATOR CURRENT OCCURRING AT A HARMONIC FREQUENCY BELOW A THRESHOLD VALUE

FIELD

The present subject matter relates generally to operating a power supply system connected to a grid, in particular a renewable power supply system having a doubly-fed induction generator, and to a respective power supply system.

BACKGROUND

Wind power is considered one of the cleanest, most environmentally friendly energy sources presently available, and wind turbines have gained increased attention in this regard. A modem wind turbine typically includes a tower, generator, gearbox, nacelle, and a rotor with one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

In many wind turbines, the generator rotor may be electrically coupled to a bi-directional power converter that includes a rotor side converter joined to a line side converter via a regulated DC link. More specifically, some wind turbines, such as wind-driven doubly-fed induction generator (DFIG) systems and full power conversion systems, may include a power converter with an AC-DC-AC topology. In such system, the generator stator is often separately connected to the power grid via a main transformer.

In certain instances, however, such systems can generate turbine harmonics that are to be controlled and/or reduced as one of the requirements from various grid codes is compliance of current and voltage harmonics at the output of the wind turbine.

In particular for DFIG-based power system supplying utility grids, low-effort, fast and reliable control of harmonics is desired.

Accordingly, the present disclosure provides a method for operating a power supply system connected to a grid as disclosed herein, a power supply system electrically connectable to a grid as disclosed herein, and a computer program product or a computer-readable storage medium as disclosed herein.

BRIEF DESCRIPTION

Aspects and advantages of the invention will be set forth in part in the following description, or may be obvious from the description, or may be learned through practice of the invention.

In one aspect, the present disclosure is directed to a method for operating a power supply system connected to a grid, in particular a respective a wind turbine. The power supply system includes a rotor, a doubly-fed induction generator (DFIG), a power conversion assembly, and an active filter. The DFIG includes a generator rotor mechanically connected with the rotor and a generator stator. The power conversion assembly includes a rotor-side power converter. The active filter is electrically connected with the generator stator via a stator bus. The rotor-side power converter is electrically connected with the generator rotor via a rotor bus. The method includes: determining, based on a rotor frequency of the generator rotor, an expected harmonic frequency for a stator current flowing on the stator bus; determining, in a data set comprising stator current values, a current amplitude of the stator current at the expected harmonic frequency; and controlling, based on the current amplitude of the stator current at the expected harmonic frequency, the active filter.

In the following the current amplitude of the stator current (at a given frequency) is also referred to as stator current amplitude (at the given frequency).

The primary sources of harmonics in DFIG-based power supply system, e.g. respective wind turbine systems, are the rotor-side and the line-side converters. The harmonics in the rotor-side converter primarily contribute in harmonics via the stator current. Stator and line currents become combined together to generate turbine harmonics (with or without the main transformer). One of the main variable contribution of harmonics to the grid of DFIG-based power supply system is found to be from the rotor side converter via the stator path.

As the active filter is connected to the stator bus and, thus, provided between the stator and the grid, harmonics supplied from the DFIG to the utility (power) grid may be reduced efficiently and fast under varying operating conditions by suitably controlling the active filter. This is achieved by determining the expected harmonic frequency of the stator current which allows determining quickly and efficiently the corresponding stator current amplitude, and, thus, controlling the active filter as desired, in near real-time, i.e. with a delay of about 10 s or less and at the next possible time of the control, respectively, during supplying the grid with electric power. This can even be achieved with comparatively small computational effort as the harmonic frequency (or harmonic frequencies) are not determined in the stator current but quickly determined and estimated with sufficiently high accuracy, respectively, based on the rotor frequency of the generator rotor.

Controlling the active filter typically includes using the expected harmonic frequency and the current amplitude to determine or amend a control signal for actively filtering the stator current at the expected harmonic frequency (frequencies), feeding the control signal to the active filter, and/or using the control signal to control the active filter.

The active filter is typically controlled based on the expected harmonic frequency (frequencies) and the stator current amplitude(s) at the expected harmonic frequency (frequencies).

The active filter typically includes (power) switches such as (power) IGBTs or MOSFETs. The switches may be controlled (via the control signal) to actively filter the stator current at the expected harmonic frequency (frequencies).

Typically, the number of switches depend on the number of phases of the stator bus. In particular, an active filter with two switches per phase, e.g. six switches for a typical three-phase stator bus may be used.

According to an embodiment, it is determined if the stator current amplitude at the expected harmonic frequency is equal to or larger than a pre-determined corresponding threshold amplitude at the respective expected harmonic frequency, in particular a corresponding threshold amplitude given by a grid code. Further, only if the stator current amplitude is equal to or larger than a pre-determined corresponding threshold amplitude, the active filter is controlled accordingly.

The active filter typically includes switches such as IGBTs or MOSFETs, and wherein the switches are controlled to actively filter the stator current at the expected harmonic frequency.

In some embodiments the expected harmonic frequency (frequencies) is (are) determined based on a grid frequency of the grid, a switching frequency of the rotor-side power converter and the rotor frequency of the generator rotor.

In other embodiments, at least one of the frequency of the grid (grid frequency) and the switching frequency of the rotor-side power converter are assumed to be constant for determining the expected harmonic frequency. This typically still results in a sufficiently good precision for given DFIG-system and grid, at least during stable grid conditions.

Typically, several expected harmonic frequencies and corresponding current amplitudes at the expected harmonic frequencies are determined.

In particular, three expected harmonic frequencies, which typically result from the three major harmonic injections of the rotor-side converter into the rotor bus at two times, three times and four times the switching frequency of the rotor-side power converter, and corresponding current amplitudes may be determined at a given time during exchanging active and or reactive electric power with the grid, in particular feeding (active) electric power to the grid.

Accordingly, the active filter may be controlled such and/or the control signal be determined such that the stator current at all or a subset of the expected harmonic frequencies is actively filtered.

At which of the expected harmonic frequencies the stator current is actively filtered by the active filter typically depend on a comparison of the stator current amplitude with a pre-determined corresponding threshold amplitude.

Accordingly, unnecessary damping of stator current harmonics can be avoided.

According to an embodiment, for each of the expected harmonic frequencies or for each of the expected harmonic frequencies of the subset, in particular for each of the expected harmonic frequencies for which the stator current amplitude is equal to or larger than the pre-determined corresponding threshold amplitude, a respective partial control signal is determined.

Further, the control signal may be determined based on or as a sum of the partial control signals and expected harmonic frequencies at which the stator current is to be damped, respectively.

According to an embodiment, the control signal is determined using at least one PLL-control, more particular a respective PLL-control for each partial control signal. The control signal can also be determined using proportional resonant control.

In an embodiment, the amplitude(s) of harmonics in stator current are determined using a Discrete Fourier Transform, DFT, or a Fast Fourier Transform (FFT).

More particular, a data set of pairs of stator current values and times may be transformed from time to frequency domain using the DFT or FFT. Thereafter, the stator current amplitude(s) may be determined in the frequency domain.

Note that the data set may in particular be a just measured data set, i.e. a data set including stator current values but typically also, grid current, rotor current, and/or line side current values measured within the last second or the last two seconds, or a recently measured data set, i.e. a data set alternatively or in addition including stator current values measured a few seconds in the past, or even up to about 10 s in the past.

According to an embodiment having particularly low computational requirements during operating the power supply system, a (predetermined) typically power system specific and/or grid specific look-up table is used to determine the expected harmonic frequency/frequencies for the output current or stator current.

In particular, a model describing the DFIG and the power conversion assembly during a normal operating mode, in which at least a major portion of the electrical output power of the power conversion assembly and the DFIG is fed to the grid, may be used to determine the expected harmonic frequency/frequencies during operating power supply system or, preferably, to determine the look-up table in advance.

In particular, the model may be used to determine the expected harmonic frequency rotor frequencies of the generator rotor in a rated rotor frequency range of the DFIG (in particular during normal operation) and the power supply system, respectively, in advance.

The model describing the DFIG and the power conversion assembly coupled with the grid may be an analytical model, a semi-analytical model, or at least substantially based on numerical simulation(s).

Modeling the DFIG and the power conversion assembly may in particular include determining phase sequences, determining a slip of the generator rotor with respect to the generator stator, and determining the expected harmonic frequency/frequencies based on the slip and the phase sequences.

In one aspect, the present disclosure is directed to a power supply system electrically connectable with a grid. The power supply system includes a rotor typically including rotor blades, a DFIG including a generator stator and a generator rotor mechanically connected with the rotor, a rotor bus, a stator bus electrically connectable with the generator stator, a power conversion assembly including a rotor-side power converter electrically connectable with the generator rotor via the rotor bus, an active filter electrically connectable with the stator bus, and a control system communicatively coupled with the power conversion system and the grid, and configured to: determine, based on a rotor frequency of the generator rotor, an expected harmonic frequency for a stator current flowing on the stator bus; determine, in a data set comprising stator current values, a corresponding current amplitude of the stator current at the expected harmonic frequency; and control, based on the corresponding current amplitude of the stator current at the expected harmonic frequency, the active filter.

The active filter is typically implemented as an active harmonic filter.

Further, the active filter may be electrically connectable with the stator bus via a two-windings transformer.

Furthermore, the active filter may include switches which are typically, controllable by a control signal received from the control system to actively filter the stator current at the expected harmonic frequency/frequencies.

According to an embodiment, the power supply system includes a step-up transformer connectable with the grid and the stator bus, in particular a three-winding step-up transformer.

Further, the power conversion assembly typically includes a two-stage power converter comprising the rotor-side converter and a line-side converter connectable via a line-side power converter bus with the step-up transformer.

Even further, a line filter connectable with the line-side power converter bus may be provided, in particular a respective passive line filter. Passive line filter are found to be sufficient to damp any harmonics caused by switching the line side converter and may not require internal switching elements.

Typically, the power supply system is a wind turbine.

Further, the control system is typically configured to perform any of the methods as explained herein.

In yet another aspect, the present disclosure is directed to a computer program product or a non-transitory computer-readable storage medium comprising instructions which, when executed by one or more processors of a power supply system, in particular a control system of the power supply systems as explained herein, cause the system to carry out any of the methods as explained herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers.

DETAILED DESCRIPTION OF THE INVENTION

Reference now will be made in detail to embodiments of the invention, one or more examples of which are illustrated in the drawings. Each example is provided by way of explanation of the invention, which shall not limit the invention. In fact, it will be apparent to those skilled in the art that various modifications and variations can be made in the present invention without departing from the scope or spirit of the invention, for instance, features illustrated or described as part of one embodiment can be used with another embodiment to yield a still further embodiment. Thus, it is intended that the present invention covers such modifications and variations as come within the scope of the appended claims and their equivalents.

Figure 1:
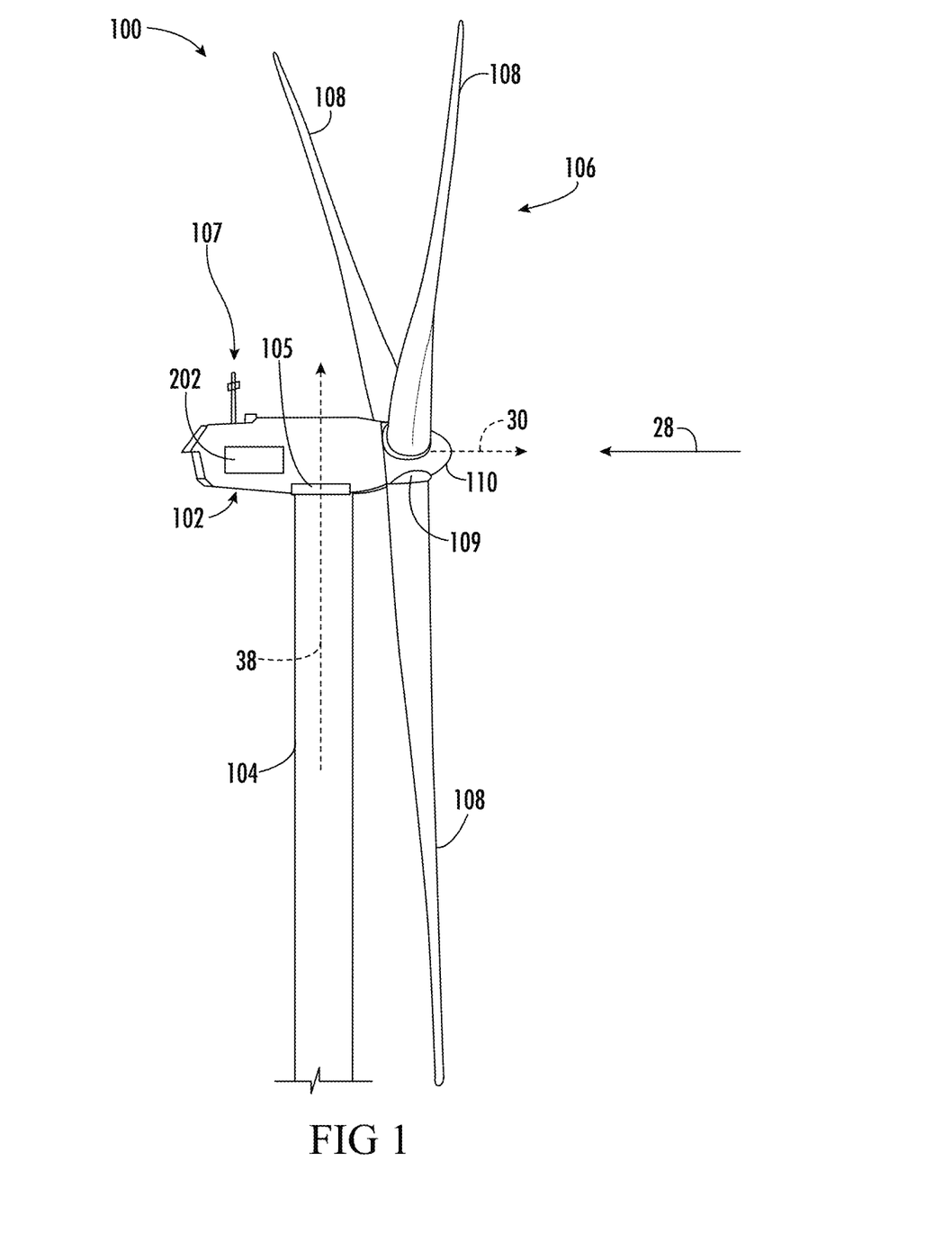
FIG. 1 illustrates a perspective view of one embodiment of a wind turbine that may be controlled and form a power supply system, respectively, according to the present disclosure.

FIG. 1 is a perspective view of a portion of an exemplary wind turbine 100. In the exemplary embodiment, the wind turbine 100 is a horizontal-axis wind turbine. Alternatively, the wind turbine 100 may be a vertical-axis wind turbine. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

The rotor blades 108 are spaced about the hub 110 to facilitate rotating the rotor 106 to enable kinetic energy to be transferred from the wind into usable mechanical energy, and subsequently, electrical energy.

In one embodiment, the rotor blades 108 have a length ranging from about 15 meters (m) to about 91 m. Alternatively, rotor blades 108 may have any suitable length that enables the wind turbine 100 to function as described herein. For example, other non-limiting examples of blade lengths include 20 m or less, 37 m, 48.7 m, 50.2 m, 52.2 m or a length that is greater than 91 m. As wind strikes the rotor blades 100 from a wind direction 28, the rotor 106 is rotated about an axis of rotation 30. As the rotor blades 108 are rotated and subjected to centrifugal forces, the rotor blades 108 are also subjected to various forces and moments. As such, the rotor blades 108 may deflect and/or rotate from a neutral, or non-deflected, position to a deflected position.

Moreover, a pitch angle of the rotor blades 108, i.e., an angle that determines a perspective of the rotor blades 108 with respect to the wind direction, may be changed by a pitch system 109 to control the load and power generated by the wind turbine 100 by adjusting an angular position of at least one rotor blade 108 relative to wind vectors. During operation of the wind turbine 100, the pitch system 109 may change a pitch angle of the rotor blades 108 such that the rotor blades 108 are moved to a feathered position, such that the perspective of at least one rotor blade 108 relative to wind vectors provides a minimal surface area of the rotor blade 108 to be oriented towards the wind vectors, which facilitates reducing a rotational speed and/or facilitates a stall of the rotor 106.

A blade pitch of each rotor blade 108 may be controlled individually by a (wind turbine) controller 202 or by a pitch control system. Alternatively, the blade pitch for all rotor blades 108 may be controlled simultaneously by said control systems.

Further, in the exemplary embodiment, as the wind direction 28 changes, a yaw direction of the nacelle 102 may be rotated, by a yaw system 105, about a yaw axis 38 to position the rotor 106 with respect to wind direction 28.

The yaw system 105 may include a yaw drive mechanism provided by nacelle 102.

Further, yaw system 105 may also be controlled by wind turbine controller 202.

Figure 2:
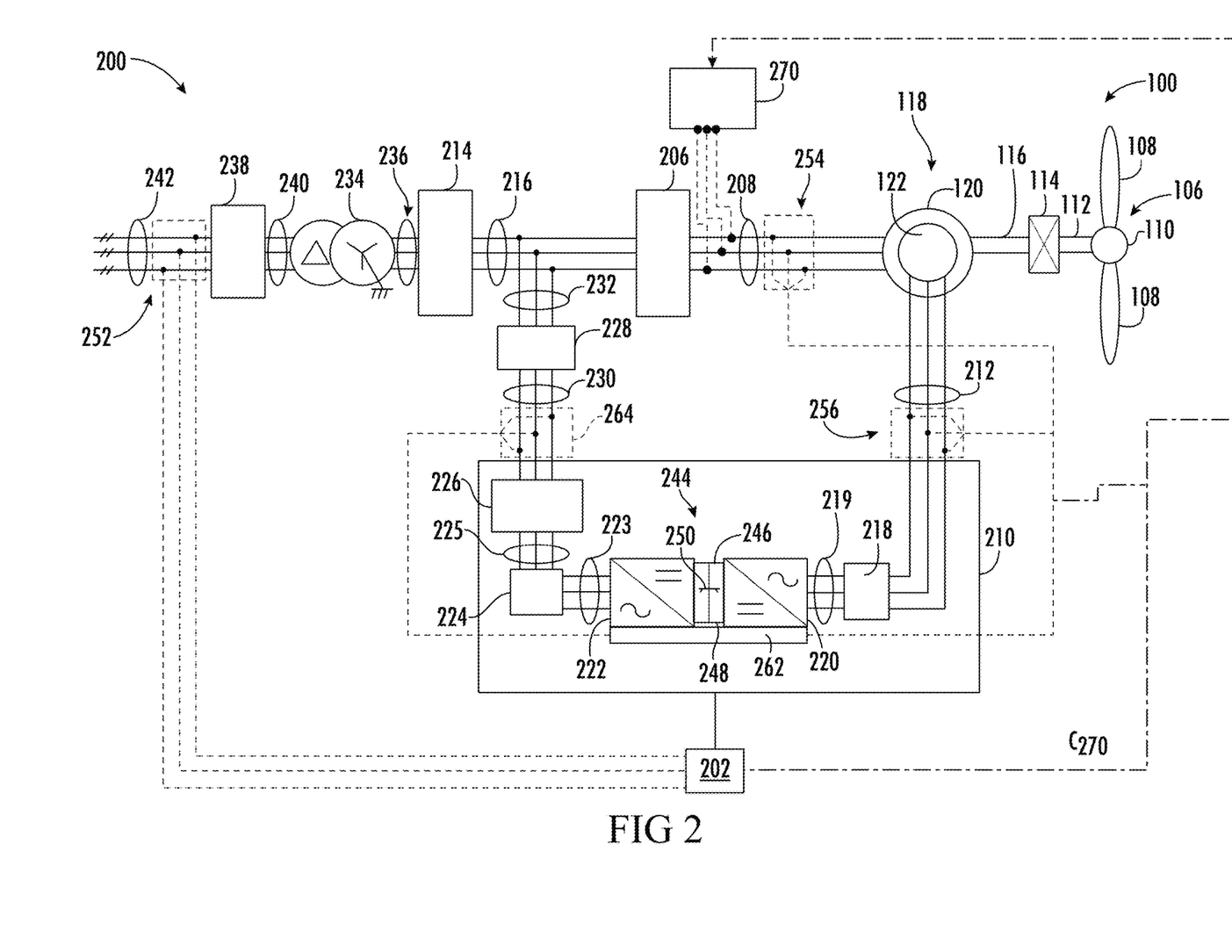
FIG. 2 illustrates a schematic view of one embodiment of an electrical power system and a control system suitable for use with the wind turbine shown in FIG. 1.

For positioning nacelle 102 appropriately with respect to the wind direction 28 as well as detecting a wind speed, the nacelle 102 may also include at least one meteorological mast 107 that may include a wind vane and anemometer (neither shown in FIG. 2). The mast 107 may provide information to the wind turbine controller 202 regarding ambient conditions. This may include wind direction and/or wind speed as well as ambient temperature, ambient moisture, precipitation type and/or amount (if any).

In the exemplary embodiment, the wind turbine controller 202 is shown as being centralized within the nacelle 102, however, the wind turbine controller may also be a distributed system throughout the wind turbine 100, on a support system (not shown in FIG. 1), within a wind farm, and/or at a remote control center. The wind turbine controller 202 includes a processor configured to perform the methods and/or steps described herein.

In a wind farm having several or even a plurality of wind turbines, the respective wind turbine controller may independently with respect to each other control the active filter.

Referring now to FIG. 2, a schematic view of one embodiment of an electrical (power) and control system 200 that may be used with the wind turbine 100 is illustrated. During operation, wind impacts the blades 108 and the blades 108 transform wind energy into a mechanical rotational torque that rotatably drives a low-speed shaft 112 via the hub 110.

In the exemplary embodiment, the low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main step-up transformer 234 via a stator bus 208, a stator synchronizing switch 206, a system bus 216, a step-up transformer circuit breaker 214, and a generator-side bus 236. The step-up transformer 234 steps up the voltage amplitude of the electrical power such that the transformed electrical power may be further transmitted to a grid via a grid circuit breaker 238, a breaker-side bus 240, and a grid bus 242.

According to an embodiment, an active filter 270 is electrically connected to (each of the three exemplary lines of) the stator bus 208 between generator rotor 122 and stator synchronizing switch 206 that may be controlled by turbine controller 202 as indicated by the dashed dotted arrow in FIG. 2.

In addition, the electrical power and control system 200 may include a wind turbine controller 202 configured to control any of the components of the wind turbine 100 and/or implement any of the method steps as described herein. For example, as shown particularly in FIG. 3A, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module to facilitate communications between the controller 202 and the various components of the wind turbine 100, e.g. any of the components of FIG. 2, in particular converter controller 262 and active filter 270.

Figure 3A:
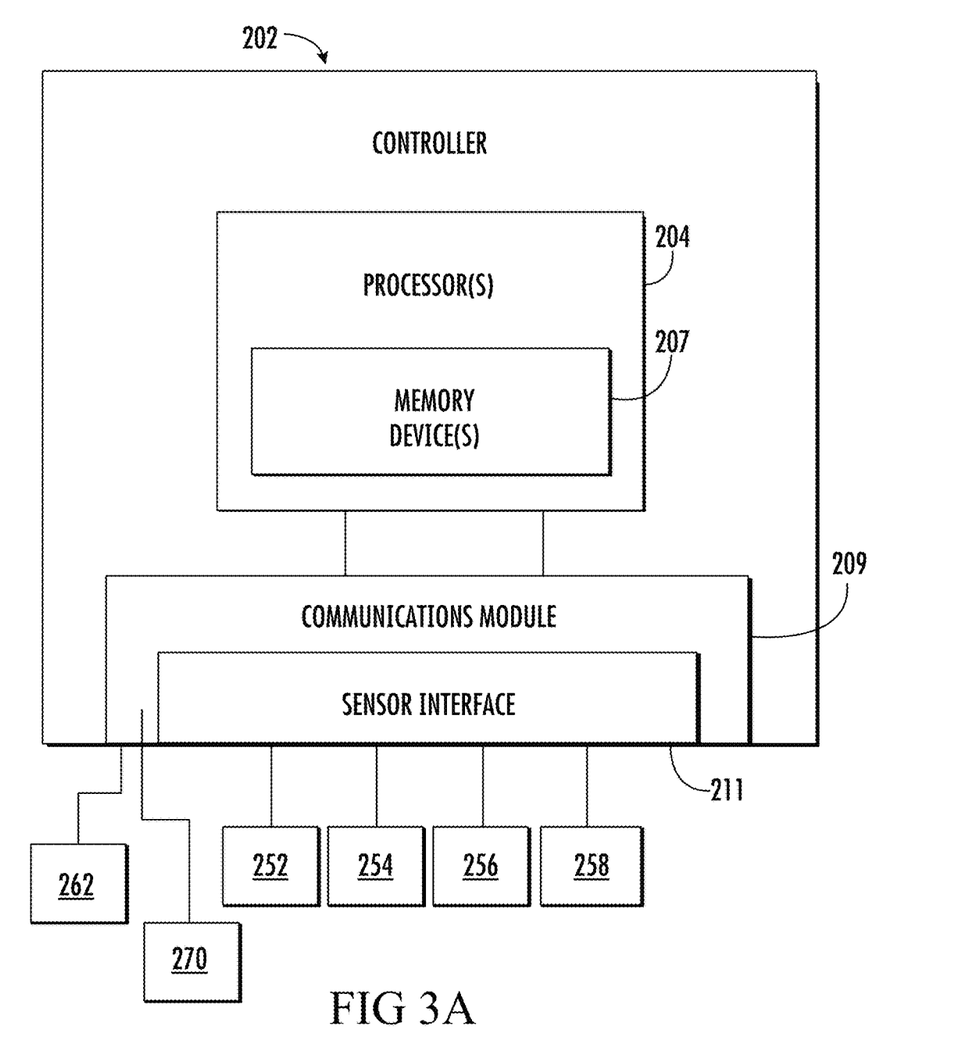
FIG. 3A illustrates a block diagram of one embodiment of a controller suitable for use with the wind turbine shown in FIG. 1.
Figure 3B:
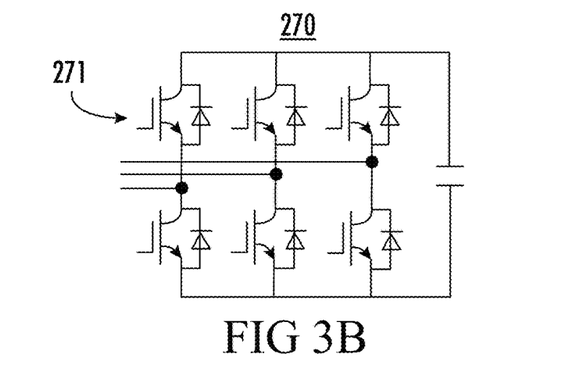
FIG. 3B illustrates a block diagram of one embodiment of an active filter suitable for use with the wind turbine shown in FIG. 1.

FIG. 3B shows an exemplary active filter 270 for damping harmonics of stator currents of the exemplary three-phase power bus 208 shown in FIG. 2.

As shown in FIG. 3B, the filter architecture may include a purely active power filter architecture with power switches (e.g. IGBTGs) 271. In such embodiments, the purely active power filter architecture may include only an active filter 270.

Alternatively, a hybrid filter architecture which includes the active power filter 270 and a passive filter between the active filter 134 and the stator bus 208.

As further shown in FIG. 3A, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3A, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

The sensors 252, 254, 256 may be sensor for currents and/or voltages desired for controlling the power conversion of wind turbine 100. This is explained in more detail below.

Further, at least one additional sensor (not shown) may be provided for sensor data referring to meteorological data, e.g. sensor(s) provided by the meteorological mast 107 shown in FIG. 1. The at least one additional sensor 258 may in particular include a sensor for determining a wind speed at or in front of rotor 106 of wind turbine 100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a step-up transformer circuit breaker 214 via a system bus 216. In an alternative embodiment, one or more fuses (not shown) are used instead of step-up transformer circuit breaker 214. In another embodiment, neither fuses nor step-up transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to step-up transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Step-up transformer circuit breaker 214 is electrically coupled to an electric power step-up transformer 234 via a generator-side bus 236. Step-up transformer 234 is electrically coupled to a grid circuit breaker 238 via a breaker-side bus 240. Grid circuit breaker 238 is connected to the electric power transmission and distribution grid via a grid bus 242. In an alternative embodiment, step-up transformer 234 is electrically coupled to one or more fuses (not shown), rather than to grid circuit breaker 238, via breaker-side bus 240. In another embodiment, neither fuses nor grid circuit breaker 238 is used, but rather step-up transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Accordingly, a current frequency of the grid may be determined by controller 202. Alternatively or in addition, turbine controller 202 may be functionally coupled with a frequency sensor connectable with the grid. Further, it is possible that controller 202 receives the current frequency of the grid or at least a signal representative for the current frequency of the grid via primary plant controller such as a wind farm controller functionally coupled with a respective sensor.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with an exemplary three-phase stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

The control system of the electrical and control system 200 may include turbine controller 202 and converter controller 262, wherein the turbine controller 202 typically operates as master controller with respect to converter controller 262.

Typically, turbine controller 202 directly controls active filter 270. However, it is also possible that the control signal $C_{270}$ for the active filter 270 is passed through converter controller 262 or even be determined by converter controller 262.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. In the exemplary embodiment, the associated electrical power is transmitted to step-up transformer 234 via stator bus 208, stator synchronizing switch 206, system bus 216, step-up transformer circuit breaker 214 and generator-side bus 236. Step-up transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, step-up transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, generator 118, power conversion assembly 210 electrically coupled to generator 118 and step-up transformer 234 form the power conversion system of wind turbine 100.

Typically, the power conversion system at least includes a generator and a power conversion assembly including a power converter, in particular an indirect AC-to-AC power converter (AC/DC-AC converter) or a matrix converter, for example a respective full converter or DFIG converter depending on the generator.

Figure 4A:
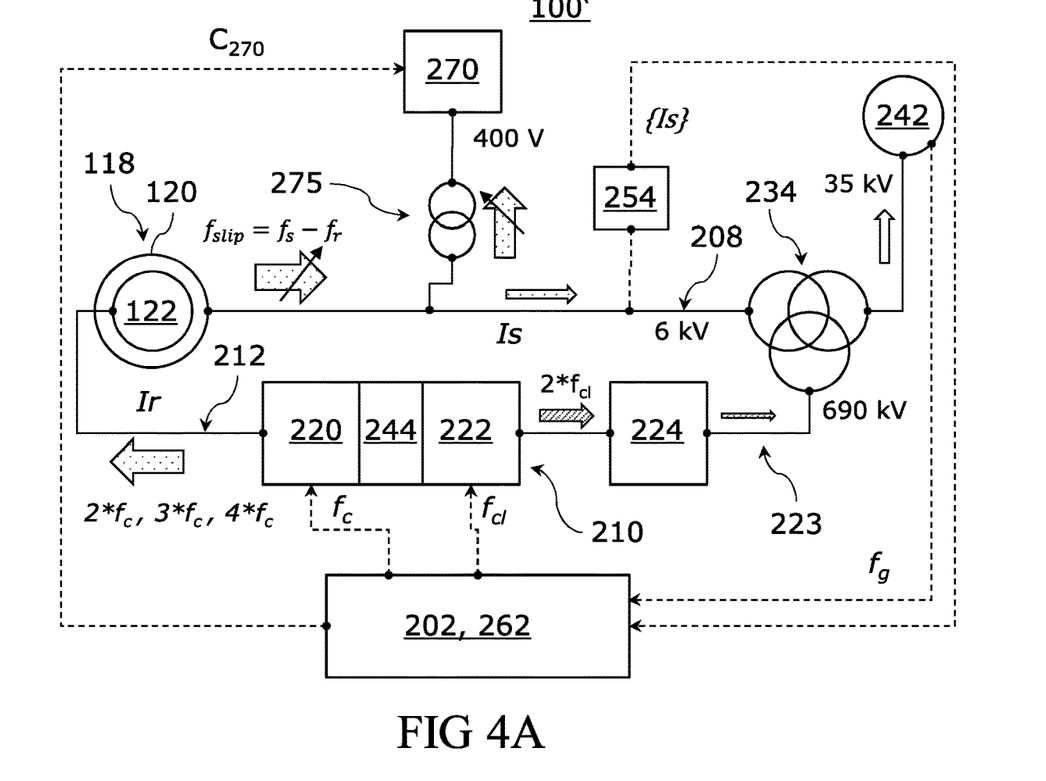
FIG. 4A illustrates a block diagram of one embodiment of a power supply system according to the present disclosure.

FIG. 4A illustrates a block diagram of a power supply system 100'. Power supply system 100' is typically similar to wind turbine 100 explained above with regard to FIG. 1 to FIG. 3B and may even refer to a wind turbine.

In the exemplary embodiment, power supply system 100' is a DFIG-based power supply system. More particular, power supply system 100' includes a DFIG 118 with a rotatable generator rotor 122 driven by a shaft and/or rotor (both not shown in FIG. 4A) and a generator stator 120, as well as a power conversion assembly 210 with a rotor-side power converter 220 and a line-side power converter 222 electrically coupled with rotor-side power converter 220 via a DC link 244. DFIG 118 may have a rated power of up to at least several MW.

During exchanging active and or reactive electric power with the utility grid 424, in particular feeding active electric power to utility grid 424, the rotor-side power converter 220 is electrically coupled with the generator rotor 122 via a rotor bus 212. Further, the line-side power converter 221 is electrically coupled with a first winding of a three winding (main) step-up transformer 234 via a line bus 223, and the stator 120 is electrically coupled with a second winding of transformer 234 via a stator bus 208. A third winding of step-up transformer 234 is electrically coupled with utility grid 242. The busses 208, 212, 223 may be three phase AC busses. Step-up transformer 234 may step up the voltage of stator bus 208 (of e.g. 6 kV) and line bus 223 (of e.g. 690 V) to a desired grid voltage (of e.g. 35 kV).

Due to switching switches of line-side power converter 222, in the following also denoted as LSC for short, and rotor-side power converter 220, in the following also denoted as RSC for short, harmonic signals are injected to line bus 223 and rotor bus 212, respectively.

For many DFIG-based power supply system, the main injected harmonic current on line bus 223 may have relevant peaks at one time and two times the switching frequency fcl of LSC 222, while the main injected harmonic current on rotor bus 212 (injected to rotor current $I_R$) may have relevant peaks at one times, two times, three times and sometimes four times the switching frequency fc of RSC 220. Note that the peak height typically decreases with frequency for such systems.

More particular, it has been found out in field measurements by the authors of the present specification that injected peaks at higher multiples of the switching frequencies fcl,fc do typically not result in violating grid code requirements such as frequency dependent upper amplitude thresholds given in an applicable grid code such as VDE 4110. Thus, damping those peaks may be dispensed with.

Further, it has found out that the only injected harmonic current peak on line bus 223 that may be relevant with respect to the grid code may safely be damped to a certain value using a passive filter 224 electrically coupled to line bus 223 if desired (see the hashed arrows in FIG. 4A).

Different thereto, the three injected harmonic current peaks on rotor bus 220 (at 2*fc, 3*fc, 4*fc) may result in corresponding harmonic current peaks on stator bus 208, however at frequencies which depend on rotor frequency fr and more particular on a slip $f_{slip}=f_s-f_r$ of generator rotor 122 with respect to generator stator (that may also be determined in terms of angular frequency corresponding to 2*π times the frequency ($\omega_{slip}=\omega_s-\omega_r$).

This can e.g. be seen from the following analytic expression, which is derived based on an equivalent circuit diagram, for stator current Is as function of time t:

$$I_S = \sum_{h=1}^{H} |I_{sh}|\cos(h\omega_s t + \varphi_{sh}) + \sum_{h=1,3k+1}^{H} |I'_{sh}|\cos(s_{rh}h\omega_{slip}t + \varphi'_{sh} + \theta_{ef}) + \sum_{h=1,3k-1}^{H} |I'_{sh}|\cos(s_{rh}h\omega_{slip}t + \varphi'_{sh} - \theta_{ef}) \quad (I)$$

with $$s_{rh} = \frac{\pm h\omega_{slip}\omega_r}{\pm h\omega_{slip}} = \frac{\pm hf_{slip} + f_r}{\pm hf_{slip}},$$

harmonic stator current amplitudes $|I_{sh}|$, $|I'_{sh}|$ for positive and negative sequences that may occur in the stator current Is depending on the operating mode and the slip rate, respectively, and harmonic order h. In the following, the harmonic stator current amplitudes $|I_{sh}|$, $|I'_{sh}|$ are also denoted as $\{I_h\}=\{|I_{sh}|, |I'_{sh}|\}$ for short. The values $\varphi_{sh}$ and $\theta_{ef}$ refer to the phase angle of stator harmonic current and phase angle between rotor and stator in steady-state, respectively. The apostrophe (') indicates that the quantities are referred to the stator frame (see E. Hernindez and M. Madrigal, "A Step Forward in the Modeling of the Doubly-fed Induction Machine for Harmonic Analysis", IEEE Transactions on Energy Conversion, vol. 29/1, p. 149-157, DOI: 10.1109/TEC.2013.2290297).

In particular, for given rotor current harmonics h*$f_c$, the stator current harmonics $f_h$ may be expressed as $$f_h = h * s_{rh} * f_{slip} \quad (II)$$

Eq. II may even be used during runtime to determine the stator current harmonics $f_h$.

Alternatively, stator current harmonics $f_h$ may be stored in a look-up table based on eq. II, a different model also taking into account the interaction with the grid, simulations of the particular power supply—grid system, and/or even field measurements.

Figure 7:
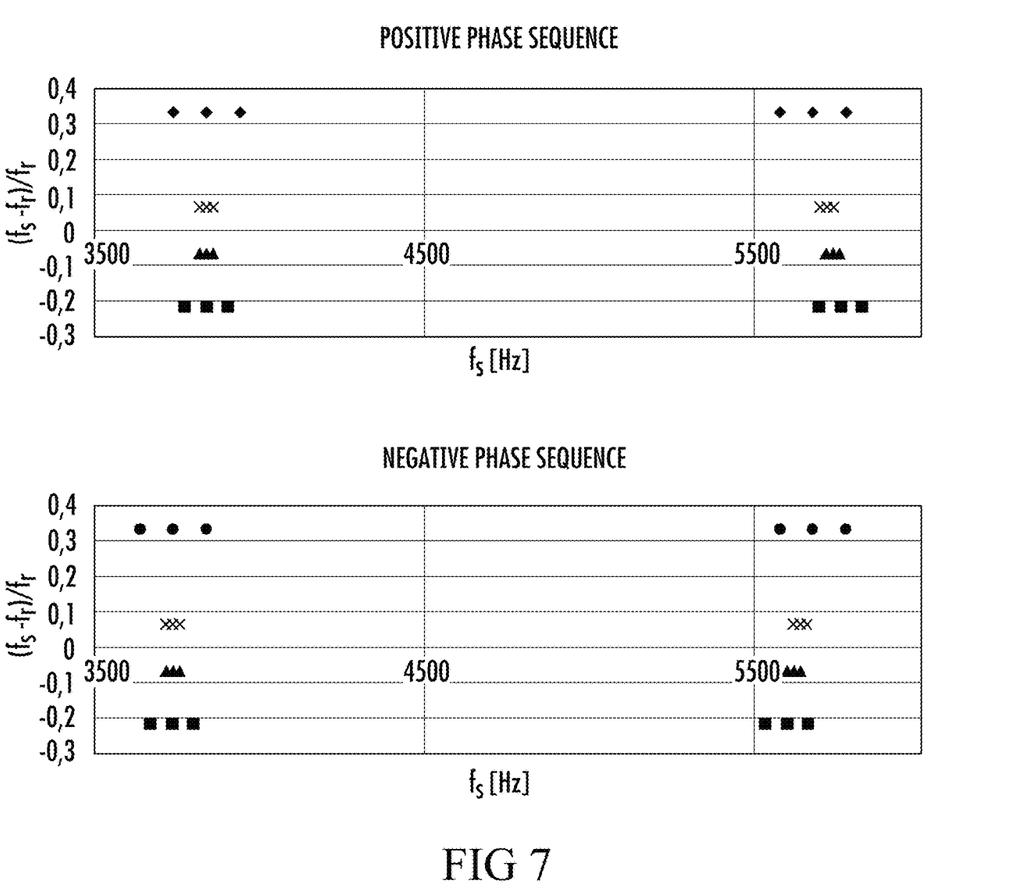
FIG. 7 illustrates expected harmonic frequencies for a stator current of a of a power supply system as shown in FIG. 2A.

In particular, the look-up table may be based on simulation(s) of the particular power supply—grid system. One example is given in FIG. 7 showing obtained harmonic frequencies $f_h$ for positive and negative phase sequences of stator current as function of relative slip $(f_s-f_r)/f_s$ for a 5.5 MW four pole DFIG-based wind turbine connected to a 50

Hz utility grid and operated with a switching of the rotor-side power converter 220 of fc=1894 Hz (resulting from $1^{st}$ and $2^{nd}$ harmonics at rotor bus).

For determined expected stator current harmonics $\{f_h\}$, stator current amplitudes $\{I_h\}$ may be determined in stator current Is as measured by electric current sensors 254, i.e. in a respective dataset $\{Is\}$ listing values of stator current Is, and received by control system 202, 262.

In particular, a primary controller 202 of power supply system 100' typically a respective turbine controller 202 may be used to determine the stator current amplitudes $\{I_h\}$ for the stator current harmonics $\{f_h\}$, and to determine, based thereon, a control signal $C_{270}$ for the active filter 270 to actively at least damp undesired stator current harmonics.

In the exemplary embodiment, active filter 270 is electrically coupled to stator path via a two-winding transformer 275 reducing the output voltages of active filter 270.

Active filter 270 is coupled in parallel with stator bus 208.

Control signal $C_{270}$ causes switching of switches of active filter 270 to damp, reduce or even substantially cancel harmonics caused by operating rotor-side converter 222 (in an overmodulation regime or close to an overmodulation regime).

Accordingly, active filter 270 may reduce or cancel harmonics to satisfy one or more grid requirements for harmonics. Active filter 270 may in particular provide current at about the same frequency and/or amplitude as the harmonics on stator path 208 and at an opposite phase, i.e. about 180 degrees out of phase.

Active filter 270 may even provide electric current with a high degree of precision to cancel harmonics, even harmonics close to the fundamental frequency or grid frequency $f_g$, with low, reduced or no impact on the power at the fundamental frequency.

This was confirmed by numerous simulations in which the operating conditions of a 5.5 MW turbine were varied.

Further, using an active filter 270 and the proposed adaptive control, respectively, instead of a passive filter coupled to stator path 208 can be shown to be more efficient. This is mainly due to the fact that harmonics at stator path depend on operating conditions, in particular rotor frequency and slip, respectively.

Typically, grid requirements regarding harmonics can safely be ensured without active filter(s) coupled to rotor bus 212 and line bus 223 (converter paths).

Figure 4B:
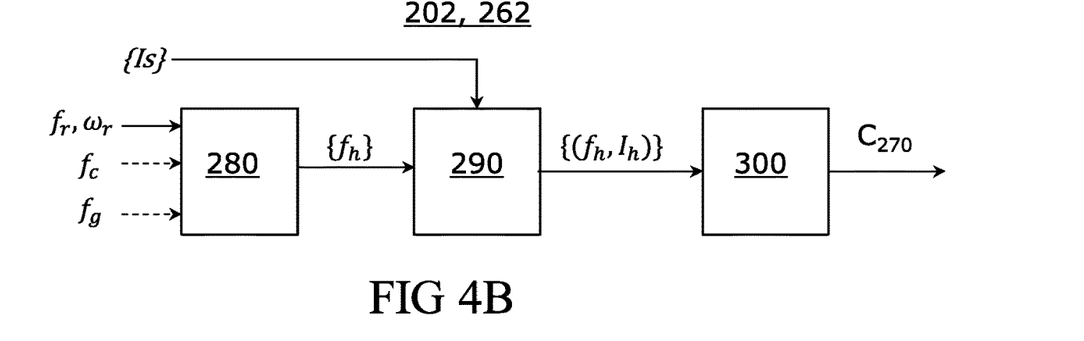
FIG. 4B illustrates a block diagram of one embodiment of a method according to an embodiment of the present disclosure.

As shown in FIG. 4B, controller 202 of power supply system 100' may, in a first block 280, determine the expected harmonic frequencies $\{f_h\}$ for the stator current Is on stator bus 208 based on the typically measured generator rotor frequency $f_g$, and typically also on the (measured) grid frequency $f_g$ and a switching frequency $f_c$ (known to controller 202) of the RSC. In many situations, grid frequency $f_g$ and/or switching frequency $f_e$ may be assumed to be constant.

Thereafter in a block 290, current amplitudes $\{I_h\}$ for the expected harmonic frequencies $\{f_h\}$ may be determined in measured data set with stator current values $\{Is\}$, in particular as corresponding data pairs $\{f_h, I_h\}$.

Thereafter, data pairs $\{f_h, I_h\}$ may be used to determine a control signal $C_{270}$ for the active filter.

Blocks 280, 290 and 300 may be implemented in software and/or hardware, for example in software only.

In one embodiment, a pre-determined look-up table is used in block 280 to directly determine the expected harmonic stator frequencies $\{f_h\}$.

Figure 4C:
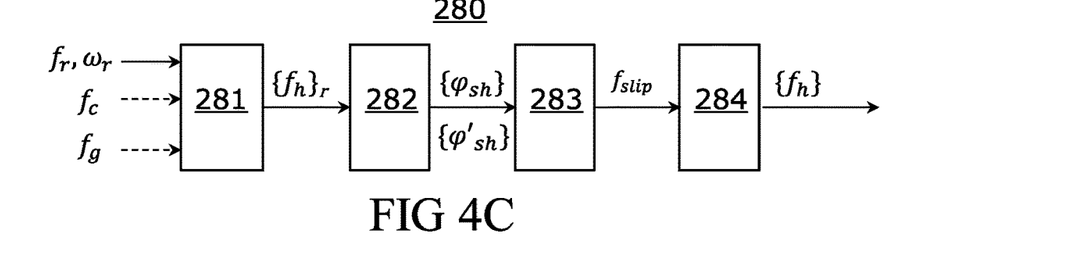
FIG. 4C illustrates a block diagram of one embodiment of a method according to an embodiment of the present disclosure.

As illustrated in FIG. 4C, block 280 may alternatively consist of several sub-blocks that may be implemented in software and/or hardware.

In a first block 281, (one or more, for example two or three) expected harmonic frequencies $\{f_h\}_r$ for the rotor current Ir flowing on the rotor bus may, based on generator rotor frequency $f_r$ and optionally on the (measured) grid frequency $f_g$ and a switching frequency $f_e$ of the RSC, be determined. This may be achieved using a respective pre-determined look-up table.

In a subsequent block 282, phase sequences ($\{\varphi_{sh}, \varphi'_{sh}\}$) for the rotor current Ir may be determined based on the expected harmonic rotor frequencies $\{f_h\}_r$.

In a subsequent block 283, a slip $f_{slip}$ of the generator rotor 122 with respect to the generator stator 120 may be calculated.

Finally, the expected harmonic stator frequencies $\{f_h\}$ may be calculated using the slip flip and the phase sequences.

Figure 5A:
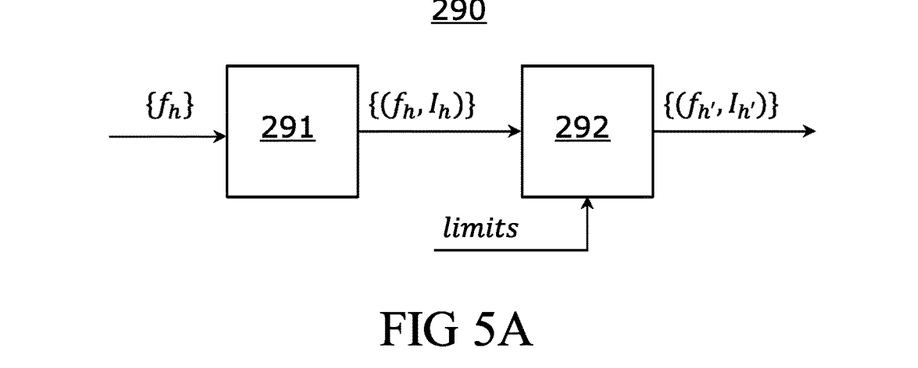
FIG. 5A illustrates a block diagram of one embodiment of a method according to an embodiment of the present disclosure.

As illustrated in FIG. 5A, block 290 explained above with respect to FIG. 4B may include a first (sub-) block 291 in which the expected harmonic frequencies $\{f_h\}$ and the corresponding current amplitudes $\{I_h\}$ of the stator current are determined, and a subsequent block 292 in which the current amplitudes $\{I_h\}$ are compared with limits (thresholds) given in an applicable grid code. Accordingly, harmonics h' to be actually damped may be determined.

Block 292 may in particular output a set of harmonic frequencies and amplitudes $\{(f_{h'}, I_{h'})\}$ used as input for determining the control signal for the active filter.

Figure 5B:
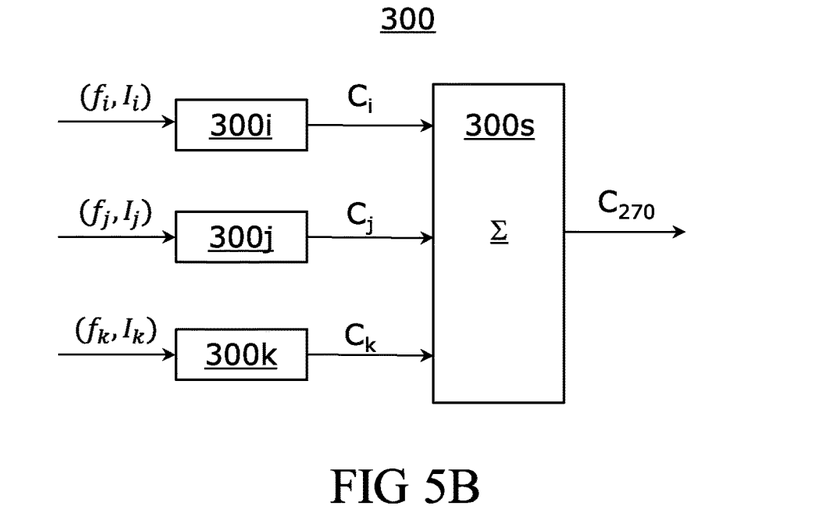
FIG. 5B illustrates a block diagram of one embodiment of a method according to an embodiment of the present disclosure.

As illustrated in FIG. 5B, block 300 of determining control signal $C_{270}$ as explained above with respect to FIG. 4B may include respective (sub-) blocks 300$i$, 300$j$, 300$k$ for each harmonics h, h' to be damped (at three exemplary frequencies $f_i$, $f_j$, $f_k$).

Each block 300$i$, 300$j$, 300$k$ receives the expected harmonic $f_i$, $f_j$, $f_k$ and corresponding current amplitude $I_i$, $I_j$, $I_k$, and determines a respective partial control signal Ci, Cj, Ck.

The control signal $C_{270}$ may then be calculated as a sum of the partial control signals Ci, Cj, Ck, in a block 300$s$.

Figure 5C:
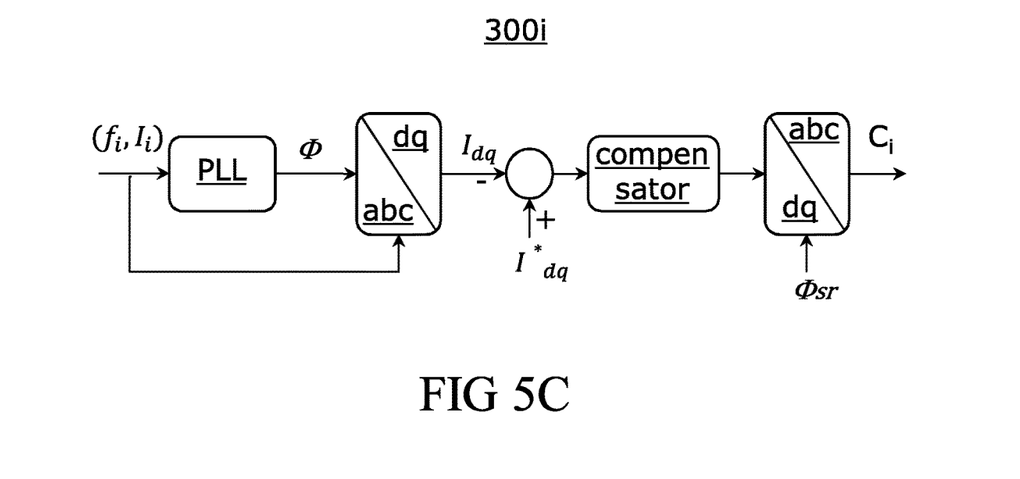
FIG. 5C illustrates a block diagram of one embodiment of a method according to an embodiment of the present disclosure.

As illustrated in FIG. 5C for block 300$i$ of FIG. 5B, partial control signals Ci, Cj, Ck may be determined using a PLL-control.

More particular, the harmonic frequency component ($f_i$, $I_i$) may be received, PLL-controlled and rotated to a d-q reference frame. For changing the reference frame, Park/Inverse Park Transformations (a-b-c to d-q/d-q to a-b-c conversions) may be used. The output $I_{dq}$ can then be regulated via a compensator which is typically implemented as a PI regulator the output of which can be rotated back to the a-b-c reference frame to determine the partial control signals Ci. The value $\Phi_{sr}$ can be selected appropriately in dq/abc conversion for improved harmonic compensation.

Figure 6A:
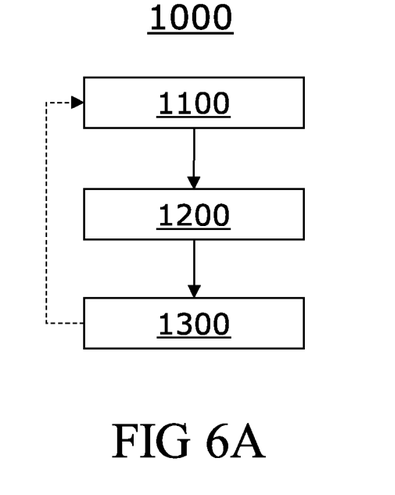
FIG. 6A illustrates a flow chart of a method according to an embodiment of the present disclosure.

FIG. 6A illustrates a flow chart of a method 1000 for operating a grid-connected power supply system, in particular a respective wind turbine.

In a first block 1100, an expected harmonic frequency for a stator current flowing on a stator bus of a DFIG-based power supply system is determined.

Thereafter, in a block 1200, a data set with stator current values is used to determine a current amplitude of the stator current at the expected harmonic frequency.

In a block 1300, the current amplitude of the stator current at the expected harmonic frequency is used for controlling an active filter electrically coupled with the stator bus so that the current amplitude of the stator current at the expected harmonic frequency is reduced and/or a grid requirement for the expected harmonic frequency is complied with.

As indicated by the dashed arrow in FIG. 6A, blocks 1100-1300 may be performed several time and in a cyclic manner, respectively.

The method explained herein may also be described as determining (in block 1100), based on a (comparatively easily determinable, in particular comparatively easily measurable/measured) rotor frequency of the generator rotor of a DFIG-based power supply system, an expected harmonic frequency of a stator current, i.e. the frequency of a harmonic stator current component, typically several expected harmonic frequencies for a stator current, flowing on a stator bus of the DFIG-based power supply system, and controlling the active filter based on the expected harmonic frequency (frequencies), typically including blocks 1200, 1300.

Figure 6B:
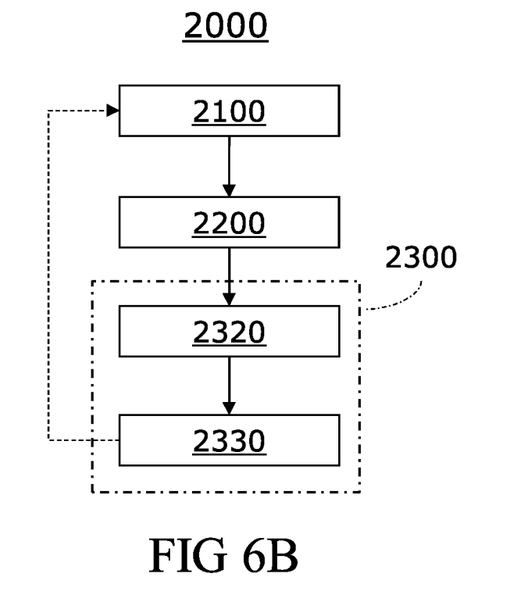
FIG. 6B illustrates a flow chart of a method according to an embodiment of the present disclosure.

FIG. 6B illustrates a flow chart of a method 2000 for operating a grid-connected power supply system, in particular a respective wind turbine. Method 2000 may be similar to method 1000 and also includes blocks 2100, 2200 of determining one or more expected harmonic frequencies, and one or more current amplitudes, respectively, but is more specific in block 2300.

In the exemplary embodiment, the expected one or more harmonic frequencies and the current amplitudes are used to determine (in a first cycle) or amend (in subsequent cycles) a control signal for the active filter, in a (sub-) block 2320.

Further, the active filter is controlled by the control signal to actively filter the stator current at the one or more expected harmonic frequencies, in a (sub-) block 2330.

Figure 6C:
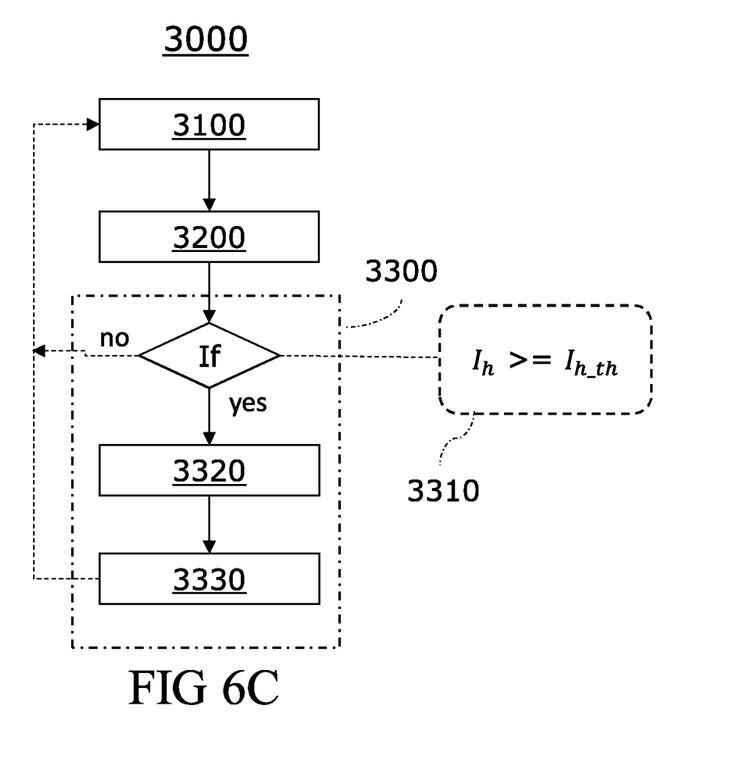
FIG. 6C illustrates a flow chart of a method according to an embodiment of the present disclosure.

FIG. 6C illustrates a flow chart of a method 3000 for operating a grid-connected power supply system, in particular a respective wind turbine. Method 3000 may be similar to methods 1000, 2000 and also includes blocks 3100, 3200 of determining one or more expected harmonic frequencies, and one or more current amplitudes, respectively, but is even more specific in block 3300.

In a (sub-) block 3310 it is, for at least one current amplitude $I_h$, checked if the current amplitude $I_h$ is equal to or larger than a pre-determined corresponding threshold amplitude $I_{h\_th}$ at the respective expected harmonic frequency h, in particular a corresponding threshold amplitude according to a grid code If so, the expected harmonic frequency $f_h$ and the corresponding current amplitude $I_h$ are used to determine or amend the control signal in a (sub-) block 3320, which is used for controlling the active filter in a subsequent (sub-) block 3330.

Otherwise, controlling of the active filter may not be amended or activated, and the method may return to block 3100.

According to an embodiment a method for operating a power supply system connected to a grid, the method includes determining, based on a slip of the generator rotor with respect to the generator, an expected harmonic frequency for a stator current flowing on the stator bus of the a power supply system, determining, in measured stator current data, a corresponding current amplitude of the stator current at the expected harmonic frequency; and controlling an active filter electrically coupled to a stator bus of the power supply system based on the corresponding current amplitude of the stator current.

According to an embodiment a method for operating a power supply system connected to a grid is provided. The power supply system includes a DFIG, a power conversion assembly, and an active filter. The DFIG includes a generator rotor and a generator stator. The power conversion assembly includes a rotor-side power converter. The active filter is electrically connected with the generator stator via a stator bus. The rotor-side power converter is electrically connected with the generator rotor via a rotor bus. The method includes: determining, based on a rotor frequency of the generator rotor, an expected harmonic frequency for a stator current (an expected frequency for a harmonic stator current component) flowing on the stator bus, and using the expected (harmonic) frequency to determine a control signal for the active filter (and/or to control the active filter) to counteract the harmonic stator current component and/or so that (an amplitude of) the stator current (harmonic stator current component) at and/or next to the expected harmonic frequency is at least reduced.

This typically includes determining, in a data set comprising stator current values, a (an actual) current amplitude of the stator current at the expected harmonic frequency (of the harmonic stator current component), and using the current amplitude of the stator current at the expected harmonic frequency to determine the control signal for the active filter and/or to control the active filter.

Exemplary embodiments of DFIG-based power supply system and methods for operating power supply system are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) 204 discussed above with reference to FIG. 3A, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) 204 of FIG. 3A) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. For example, the control system of the wind farm may be provided by one centralized controller or a plurality of interconnected controllers. Such other examples are intended to be within the scope of the claims if they have structural elements that do not differ from the literal language of the claims, or if they include equivalent structural elements with insubstantial differences from the literal language of the claims.

REFERENCE NUMBERS power supply system/wind turbine 100, 100'
nacelle 102
tower 104
yaw system 105
rotor 106
meteorological mast 107
blades 108
pitch system 109
hub 110
low speed shaft 112
gearbox 114
high speed shaft 116
generator 118
generator stator 120
generator rotor 122
control system 200
turbine controller 202
processor 204
synchronizing switch 206
memory 207
stator bus 208
communications module 209
power conversion assembly 210
sensor interface 211
rotor bus 212
transformer circuit breaker 214
system bus 216
rotor filter 218
filter bus 219
rotor-side power converter 220
line side power converter 222
line side power converter bus 223
line filter 224
line bus 225
line contactor 226
conversion circuit breaker 228
conversion circuit breaker bus 230
connection bus 232
electric power main transformer 234
generator-side bus 236
grid circuit breaker 238, 538
breaker-side bus 240
distribution grid via a grid bus 242, 524
DC link 244
positive rail 246
negative rail 248
capacitor 250
electric current sensors 252
electric current sensors 253
electric current sensors 254
electric current sensors 256
meteorological data sensors 258
converter controller 262
electric current sensors 264
active filter 270
switches of active filter 271
control signal $C_{270}$
method, method steps >=1000

The invention claimed is:

1. A method for operating a power supply system to supply power to a grid connected to the power supply system, the power supply system comprising:
a rotor,
a doubly-fed induction generator (DFIG),
a power conversion assembly, and
an active filter,
the DFIG comprising a generator rotor mechanically connected with the rotor and a generator stator,
the power conversion assembly comprising a rotor-side power converter,
the active filter electrically connected with the generator stator via a stator bus,
the rotor-side power converter electrically connected with the generator rotor via a rotor bus,
the method comprising:
determining a predicted harmonic frequency of a stator current flowing on the stator bus at an expected harmonic frequency of the generator rotor;
based on correlating previously-measured stator current values to stator current frequencies, determining a corresponding current amplitude of the stator current on the stator bus at the predicted harmonic frequency of the stator current; and
controlling the active filter based on the corresponding current amplitude of the stator current on the stator bus so that an actual current amplitude of the stator current on the stator bus at the predicted harmonic frequency is maintained below a threshold amplitude value.

2. The method of claim 1, wherein controlling the active filter comprises generating a control signal to control active switches of the active filter.

3. The method of claim 1, wherein the predicted harmonic frequency of the stator current is determined based on a grid frequency of the grid, a switching frequency of the rotor-side power converter, or a rotor frequency of the generator rotor, wherein an additional predicted harmonic frequency of the stator current and a corresponding additional predicted current amplitude of the stator current at the additional predicted harmonic frequency of the stator current are determined for each of a plurality of additional harmonic frequencies of the generator rotor, and wherein the active filter responds to a control signal to maintain the actual current amplitude of the stator current at each of the additional predicted harmonic frequencies of the stator current below a corresponding threshold amplitude value.

4. The method of claim 3, further comprising:
determining a respective partial control signal for each of the additional predicted harmonic frequencies of the stator current, and
wherein the partial control signals are summed to generate the control signal for the active filter.

5. The method of claim 1, wherein a Discrete Fourier transform (DFT) or a Fast Fourier Transform (FFT) is used to transform the previously-measured stator current values from a time domain to a frequency domain to determine the corresponding current amplitude of the stator current on the stator bus at the predicted harmonic frequency of the stator current.

6. The method of claim 1, wherein determining the predicted harmonic frequency of the stator current comprises one or more of:
using a look-up table that correlates harmonic frequencies of the stator current to respective harmonic frequencies of the generator rotor;
using a model of the DFIG and the power conversion assembly operating in a mode wherein electrical output power of the DFIG is fed through the power conversion assembly to the grid; or
determining both of (i) phase sequences for rotor current based on the expected harmonic frequency of the generator rotor, and (ii) a slip of the generator rotor with respect to the generator stator.

7. A computer program product or a non-transitory computer-readable storage medium comprising instructions which, when executed by one or more processors of the power supply system, causes the power supply system to carry out the method according to claim 1.

8. A power supply system electrically connectable with a grid to supply power to the grid, the power supply system comprising:
a rotor;
a doubly-fed induction generator (DFIG) comprising a generator stator and a generator rotor mechanically connected with the rotor;
a rotor bus;
a stator bus electrically connectable with the generator stator;
a power conversion assembly comprising a rotor-side power converter electrically connected with the generator rotor via the rotor bus;
an active filter electrically connected with the stator bus; and
a control system configured to:
determine a predicted harmonic frequency of a stator current flowing on the stator bus at an expected harmonic frequency of the generator rotor;
based on previously-measured stator current values correlated to stator current frequencies, determine a corresponding current amplitude of the stator current at the predicted harmonic frequency of the stator current; and
control the active filter based on the corresponding current amplitude of the stator current at the predicted harmonic frequency of the stator current so that an actual current amplitude of the stator current on the stator bus at the predicted harmonic frequency of the stator current is maintained below a threshold amplitude value.

9. The power supply system of claim 8, wherein the active filter comprises an active harmonic filter electrically connected with the stator bus via a two-windings transformer, the active harmonic filter comprising switches controllable by a control signal to actively filter the stator current at the predicted harmonic frequency of the stator current.

10. The power supply system of claim 8, wherein the power supply system comprises a step-up transformer connected with the stator bus.

11. The power supply system of claim 10, wherein the power conversion assembly further comprises a two-stage power converter comprising the rotor-side converter and a line-side converter connectable via a line-side power converter bus with the step-up transformer.

12. The power supply system of claim 11, further comprising a line filter connected with the line-side power converter bus.

13. The power supply system of claim 8, wherein the power supply system is a wind turbine.

\* \* \* \* \*